US010914676B2

(12) United States Patent
Fukutake (10) Patent No.: US 10,914,676 B2
(45) Date of Patent: Feb. 9, 2021

(54) OBSERVATION APPARATUS AND OBSERVATION METHOD

(71) Applicant: NIKON CORPORATION, Tokyo (JP)

(72) Inventor: Naoki Fukutake, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 105 days.

(21) Appl. No.: 16/204,372

(22) Filed: Nov. 29, 2018

(65) Prior Publication Data

US 2019/0094133 A1 Mar. 28, 2019

Related U.S. Application Data

(63) Continuation of application No. PCT/JP2017/019977, filed on May 29, 2017.

(30) Foreign Application Priority Data

May 30, 2016 (JP) .................. 2016-107936

(51) Int. Cl.
*G01J 3/44* (2006.01)
*G01N 21/27* (2006.01)
*G01N 21/64* (2006.01)
*G01N 21/65* (2006.01)
*G02B 21/00* (2006.01)

(52) U.S. Cl.
CPC ............. *G01N 21/27* (2013.01); *G01N 21/64* (2013.01); *G01N 21/65* (2013.01); *G02B 21/00* (2013.01)

(58) Field of Classification Search
CPC ................. G01N 21/65; G01N 21/658; G01N 2021/656; G01J 3/44; G01J 3/02

USPC .......................................................... 356/301
See application file for complete search history.

(56) References Cited

U.S. PATENT DOCUMENTS

| 6,134,002 | A | 10/2000 | Stimson et al. |
| 6,134,009 | A | 10/2000 | Zavislan |
| 10,552,965 | B1* | 2/2020 | Kobayashi ............. G01N 21/74 |
| 2005/0057756 | A1 | 3/2005 | Fang-Yen et al. |
| 2010/0073675 | A1* | 3/2010 | Harada .............. G01N 21/3103 356/317 |
| 2014/0339446 | A1 | 11/2014 | Yamamoto et al. |
| 2015/0146980 | A1* | 5/2015 | Itoh ........................ G06T 5/007 382/167 |
| 2016/0370280 | A1* | 12/2016 | Yamamoto ......... G01N 15/1434 |
| 2017/0108450 | A1* | 4/2017 | von Chamier-Glisczinski ............ G06K 9/64 |

(Continued)

FOREIGN PATENT DOCUMENTS

| JP | 50-112747 | 9/1975 |
| JP | 2000-206036 | 7/2000 |
| JP | 2005-62155 | 3/2005 |

(Continued)

OTHER PUBLICATIONS

International Search Report dated Aug. 15, 2017 in corresponding International Patent Application No. PCT/JP2017/019977.

(Continued)

*Primary Examiner* — Md M Rahman (57) ABSTRACT

An observation apparatus in this embodiment includes a light source configured to irradiate an observation target with light, and a processing unit configured to generate an image based on Rayleigh scattered light derived from $\chi^{(3)}$ included in light obtained from the observation target.

18 Claims, 6 Drawing Sheets

(56) References Cited

U.S. PATENT DOCUMENTS

2018/0138330 A1* 5/2018 Choi .................... H01L 51/447

FOREIGN PATENT DOCUMENTS

| JP | 2007-524075 | 8/2007 |
| JP | 2012-202812 | 10/2012 |
| JP | 2015-137969 | 7/2015 |

OTHER PUBLICATIONS

English Translation by WIPO of the International Preliminary Report on Patentability dated Dec. 4, 2018 in corresponding International Patent Application No. PCT/JP2017/019977, 9 pgs.
G. Boudebs, et al., "Third-order susceptibility measurements by nonlinear image processing", Journal of the Optical Society of America—B, vol. 13, No. 7, Jul. 1996, XP055654557 pp. 1450-1456.
N. V. Kuzmin, et al., "Third harmonic generation imaging for fast, label-free pathology of human brain tumors", Biomedical Optics Express, vol. 7, No. 5, May 1, 2016, XP055654552 pp. 1889-1904.
Bettina Weigelin, et al., "Third harmonic generation microscopy of cells and tissue organization", Journal of Cell Science, vol. 129, Jan. 2016, XP055654635, pp. 245-255.
Extended European Search Report dated Jan. 15, 2020 in corresponding European Patent Application No. 17806634.6.
Taiwanese Office Action dated Sep. 23, 2020, in corresponding Taiwanese Patent Application No. 106117889.

* cited by examiner

OBSERVATION APPARATUS AND OBSERVATION METHOD

This application is a continuation of international application No. PCT/JP2017/019977 filed May 29, 2017 which claims the foreign priority benefit to Japanese Patent Application No. 2016-107936 filed on May 30, 2016, the disclosures of which are incorporated herein by reference.

BACKGROUND

1. Technical Field

The present invention relates to an observation apparatus and an observation method.

2. Related Art

In the prior art, in a pathological diagnosis through which a pathologist makes a diagnosis of cancer or the like, an observational diagnosis is made using a bright field microscope after a tissue section is prepared and stained. The problem involved in such a technique is that it takes much time to prepare a sample. Therefore, a tool is required for making a quick judgment, for example, whether the tissue has turned to cancer without preparing a section in an observation of a tissue cut from a patient or in an intraoperative tissue diagnosis during open abdominal surgery, endoscopic surgery or the like. To achieve the objective, it is required that the microscope not be of transmission type but of reflection type, and an unstained imaging technique be used which has the sectioning capability capable of obtaining a cross-sectional image of any position in the Z-direction in a plane perpendicular to the optical axis direction. For the unstained imaging technique, the microscope utilizing the coherent interaction is known (see Patent Document 1, for example). However, for the microscope utilizing the coherent interaction, when it is of reflection type, sufficient signal intensity may not be obtained and a side wall of a cell, for example, cannot be observed.

PRIOR ART DOCUMENT

[Patent Document] Patent Document 1: Japanese Patent Application Publication No. 2005-62155

SUMMARY

According to the first aspect of the present invention, an observation apparatus includes a light source configured to irradiate an observation target with light, and a processing unit configured to generate an image based on Rayleigh scattered light derived from $\chi^{(3)}$ included in light obtained from the observation target.

According to the second aspect of the present invention, an observation apparatus includes a light source configured to irradiate an observation target with light, and a detecting unit configured to at least partially block light derived from $\chi^{(1)}$ and detect Rayleigh scattered light derived from $\chi^{(3)}$, where the Rayleigh scattered light derived from $\chi^{(3)}$ and the light derived from $\chi^{(1)}$ are included in light obtained from the observation target.

According to the third aspect of the present invention, an observation method includes generating an image based on Rayleigh scattered light derived from $\chi^{(3)}$ included in light obtained from an observation target irradiated with light from a light source.

According to the fourth aspect of the present invention, an observation method includes at least partially blocking light derived from $\chi^{(1)}$ and detecting Rayleigh scattered light derived from $\chi^{(3)}$, where the Rayleigh scattered light derived from $\chi^{(3)}$ and the light derived from $\chi^{(1)}$ are included in light obtained from an observation target irradiated with light from a light source.

According to the fifth aspect of the present invention, an observation apparatus includes a light source configured to irradiate an observation target with excitation light; at least one light splitting unit arranged on an optical path of light obtained from the observation target and configured to split the light into beams of light; at least two mirrors capable of adjusting an optical path length difference between the beams of light from the light splitting unit; and a detector configured to detect Rayleigh scattered light derived from $\chi^{(3)}$ included in beams of light reflected by the at least two mirrors, wherein the beams of light from the light splitting unit are combined after reflected by the at least two mirrors, and the detector detects the Rayleigh scattered light derived from $\chi^{(3)}$ included in combined light.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
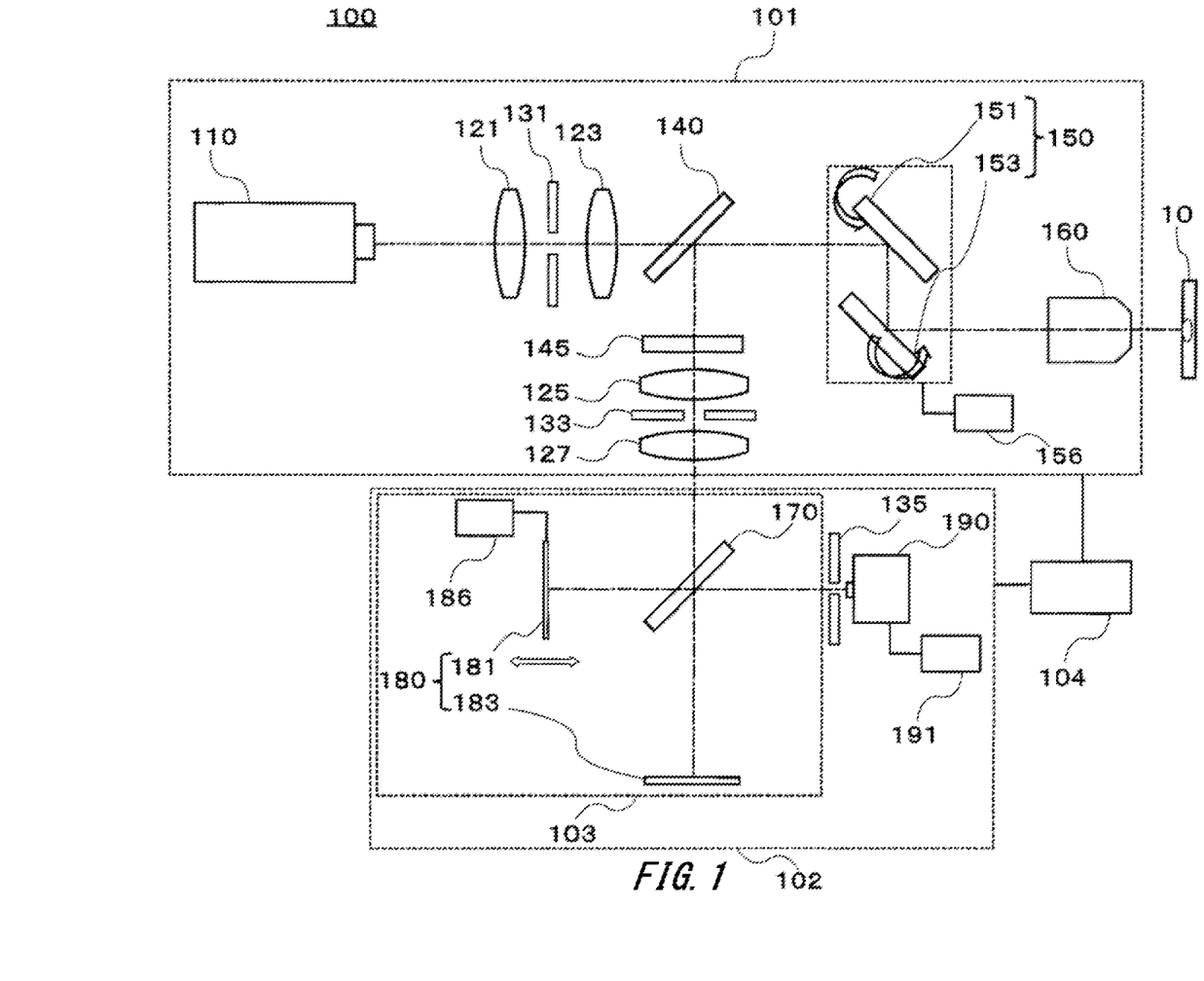
FIG. 1 is a schematic view of an observation apparatus 100.

FIG. 1 is a schematic view of an observation apparatus 100. The observation apparatus 100 includes a confocal optical system 101, a detecting unit 102, and a controlling unit 104.

The confocal optical system 101 includes a laser light source 110, lenses 121, 123, 125, and 127, pinholes 131 and 133, a half-silvered mirror 140, a bandpass filter 145, a pair of X-Y scanning mirrors 150, a scanning driving unit 156, and an objective lens 160. The confocal optical system 101 is an epi-illumination optical system, and the objective lens 160 of the confocal optical system 101 is brought adjacent to the observation target 10 when the observation target 10 is observed.

The laser light source 110 emits narrowband CW laser light as excitation light. A light source which is commonly used for a Raman microscope is used as the laser light source 110, and the laser light preferably has a short wavelength, for example approximately 488 nm in the visible region.

The lens 121, which is arranged on an optical path of the observation apparatus 100 at such a position as to receive the excitation light emitted from the laser light source 110, converges the excitation light on a circular aperture of the pinhole 131 arranged adjacent thereto. The lens 123, which is arranged on the optical path of the observation apparatus 100 at a position adjacent to the pinhole 131, collimates the excitation light from the laser light source 110 which has passed through the circular aperture of the pinhole 131.

The half-silvered mirror 140, which is arranged at a predetermined angle on the optical path of the observation apparatus 100, transmits at least a part of the collimated excitation light from the lens 123. The half-silvered mirror 140 also reflects at least a part of collimated back-reflected light from the pair of X-Y scanning mirrors 150, changing the optical path of the reflected part of collimated back-reflected light.

The pair of X-Y scanning mirrors 150, which is arranged on the optical path of the observation apparatus 100, reflects the collimated excitation light from the half-silvered mirror 140, changing the optical path of the collimated excitation light. The pair of X-Y scanning mirrors 150 also reflects back-reflected light from the observation target 10 which has passed through and has been collimated by the objective lens 160, directing the back-reflected light in the reverse direction along the optical path of the excitation light from the half-silvered mirror 140. The pair of X-Y scanning mirrors 150 is resonance-type galvano mirrors, for example, and has X-Y scanning mirrors 151 and 153 which rock about the respective axes the directions of which are different from each other. The scanning driving unit 156 drives the pair of X-Y scanning mirrors 151 and 153 to change the optical path of the light entering the pair of X-Y scanning mirrors 150 two-dimensionally and in the direction crossing the optical axis.

The objective lens 160, which is arranged on the optical path of the observation apparatus 100 at such a position as to receive the collimated excitation light from the pair of X-Y scanning mirrors 150, converges the excitation light on a certain point on the observation target 10 arranged adjacent thereto. The objective lens 160 also collimates the back-reflected light from the observation target 10.

The bandpass filter 145, which is arranged on the optical path of the observation apparatus 100, receives the back-reflected light from the observation target 10 reflected by the half-silvered mirror 140 and transmits light of a predetermined wavelength band and filters out light of the other wavelength bands. To be specific, as described below in detail, the bandpass filter 145 receives the light from the observation target 10, and transmits light derived from $\chi^{(1)}$, and transmits Rayleigh scattered light and filters out light other than the Rayleigh scattered light, where the Rayleigh scattered light and the light other than the Rayleigh scattered light are included in the light derived from $\chi^{(3)}$. In this way, Raman scattered light or intrinsic fluorescence, which is included in light from the observation target 10, is prevented from entering the detecting unit 102.

The lens 125, which is arranged on the optical path of the observation apparatus 100, converges the light from the observation target 10 which has been transmitted through the bandpass filter 145 on a circular aperture on the pinhole 133 arranged adjacent thereto. The lens 127, which is arranged on the optical path of the observation apparatus 100 at a position adjacent to the pinhole 133, collimates the light from the observation target 10 which has passed through the circular aperture of the pinhole 133 and directs the collimated light to the inside of the detecting unit 102 arranged adjacent thereto.

As described above, in the confocal optical system 101, the position of the circular aperture of the pinhole 131 and the certain point on the observation target 10 that is a focus position of the objective lens 160 are conjugate with each other. Similarly, the certain point on the observation target 10 that is the focus position of the objective lens 160 and the position of the circular aperture of the pinhole 133 are conjugate with each other.

The detecting unit 102 includes a blocking unit 103, a pinhole 135, a detector 190, and an output unit 191. The detecting unit 102 is arranged adjacent to the confocal optical system 101 to receive the light from the observation target 10, which has passed through and has been collimated by the lens 127 of the confocal optical system 101.

The blocking unit 103 has a configuration that is the same as that of a Michelson interferometer, for example, and has a beam splitter 170, a pair of mirrors 180, and a vibration driving unit 186. The blocking unit 103 at least partially blocks some of a plurality of light components included in the light from the observation target 10. Note that the configuration of the blocking unit 103 may be the same as the configuration of, for example, a Mach-Zehnder interferometer which is partially different from the one shown in the figure, that is, may be a configuration which has two beam splitters 170.

The beam splitter 170, which is arranged on the optical path of the observation apparatus 100, splits the collimated light from the confocal optical system 101 into two beams of light with the same signal intensity. The beam splitter 170 also combines two collimated beams of light reflected by the pair of mirrors 180. Note that the beam splitter 170 is one example of a light splitting unit.

The pair of mirrors 180, which is arranged on the optical path of the observation apparatus 100, are a pair of mirrors which can adjust an optical path length difference between the two beams of light from the beam splitter 170. The pair of mirrors 180 has a movable mirror 181 and a stationary mirror 183. The vibration driving unit 186 is for example, a piezo element that converts voltage applied on a piezoelectric body into force, and changes the position of the movable mirror 181 along the optical path. The vibration driving unit 186 also causes the movable mirror 181 to vibrate about a predetermined center along the optical path.

The pinhole 135, which is arranged on the optical path of the observation apparatus 100, is located such that the circular aperture of the pinhole 135 partially stops the collimated light which has not been blocked by the blocking unit 103. The detector 190, which is for example, a photomultiplier and is arranged adjacent to the pinhole 135 on the optical path of the observation apparatus 100, detects the collimated light which has not been blocked by the blocking unit 103 and has not been stopped by the circular aperture of the pinhole 135. Note that the detector 190 is one example of a detector.

The output unit 191, which is for example, a processing apparatus having a display and is electrically connected to the detector 190, displays an observation image of the observation target 10 generated from the light detected by the detector 190 to an observer. Note that the output unit 191 is one example of a processing unit.

As described above, the position of the circular aperture of the pinhole 133 in the confocal optical system 101 and the position of the circular aperture of the pinhole 135 in the detecting unit 102 are conjugate with each other. Therefore, in the entire observation apparatus 100, a certain point on the observation target 10 that is a focus position of the objective lens 160 and the position of the circular aperture of the pinhole 135 arranged in front of the detector 190 are conjugate with each other. With the configuration, unnecessary scattered light from surroundings can be eliminated by a plurality of pinholes and only the light from the focused position on the observation target 10 can be detected at high contrast and high resolution.

The controlling unit 104, which is electrically connected to the confocal optical system 101 and the detecting unit 102, controls driving of the scanning driving unit 156 in the confocal optical system 101 and driving of the vibration driving unit 186 in the detecting unit 102.

The entire configuration of the observation apparatus 100 is described as above. Now the details of the light obtained from the observation target 10 are described using FIG. 2.

Figure 2:
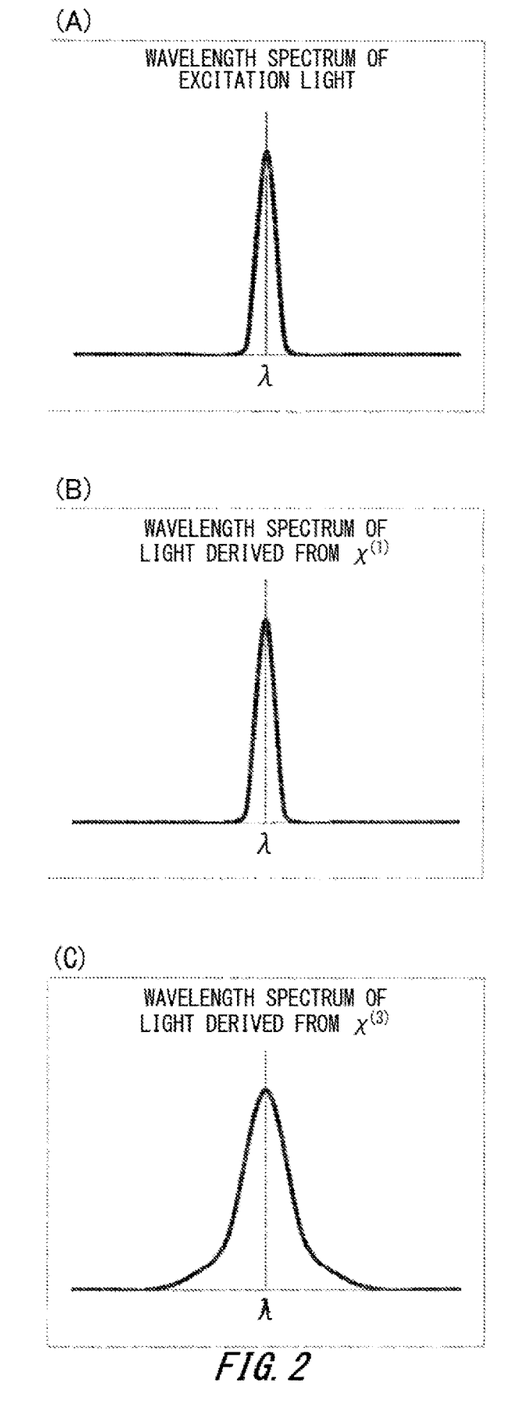
FIG. 2 is an illustrative view in which wavelength spectra are compared.

FIG. 2 is an illustrative view in which wavelength spectra are compared. (A) of FIG. 2 schematically shows a wavelength spectrum of the excitation light emitted from the laser light source 110, (B) of FIG. 2 schematically shows a wavelength spectrum of coherent light derived from $\chi^{(1)}$ included in the light obtained from the observation target 10 irradiated with the excitation light, and (C) of FIG. 2 schematically shows a wavelength spectrum of incoherent light derived from $\chi^{(3)}$ included in the light obtained from the observation target 10 irradiated with the excitation light, respectively.

The light obtained from the observation target 10 irradiated with the excitation light includes light derived from $\chi^{(3)}$ and light derived from $\chi^{(1)}$. $\chi^{(1)}$ means the linear susceptibility. The light derived from $\chi^{(1)}$ refers to the light originated in the term proportional to $\chi^{(1)}$ when the polarization induced by electric field of excitation light is expanded in a power series. On the other hand, $\chi^{(3)}$ means the third-order non-linear susceptibility. The light derived from $\chi^{(3)}$ refers to the light originated in the term proportional to $\chi^{(3)}$ when the polarization induced by electric field of the excitation light is expanded in a power series.

For the light derived from $\chi^{(1)}$, there is coherence among scattered beams of light, and all of a center wavelength, a phase, and a line width are the same as those of the excitation light. As understood from the comparison between (A) and (B) of FIG. 2, the spectral width of the light derived from $\chi^{(1)}$ is the same as the line width of the excitation light from the laser light source 110. The light derived from $\chi^{(1)}$ is coherent light. The generated light derived from $\chi^{(1)}$ has a clear phase. When beams of light each having a clear phase interfere mutually, the constructive interference which means the waves add each other occurs only in certain directions and the destructive interference which means the waves cancel each other occurs in the other directions. For this reason, the light has the characteristic of propagating only in the certain directions. A typical example is reflection at an interface. Reflected light from, for example, a side wall of a cell that is parallel to incident light constructively interferes forward only and destructively interferes in other directions, for example, backward, which results in the side wall disappearing from an image when the cell is observed with a reflection microscope. The signal intensity of the light derived from $\chi^{(1)}$ is greater than that of the light derived from $\chi^{(3)}$. A typical microscope which makes a $\chi^{(1)}$ distribution visible is a bright field microscope and the cut-off frequency that is an indicator of resolution is 2 NA/$\lambda$. Since the cut-off frequency of the confocal fluorescence microscope is 4 NA/$\lambda$, when the light derived from $\chi^{(1)}$ is observed with a confocal microscope, the resolution of the confocal microscope is lower than that of a confocal fluorescence microscope.

In contrast, for the light derived from $\chi^{(3)}$, there is not coherence among scattered beams of light, and a phase and a line width are different from those of the excitation light. The light derived from $\chi^{(3)}$ has a spectral width which depends on a phase relaxation time $T_2$, and as understood from the comparison between (A) and (C) of FIG. 2, the spectral width is wider than the line width of the excitation light from the laser light source 110. Since the light derived from $\chi^{(3)}$ which is generated through spontaneous process does not have coherence, it is incoherent light which does not interfere mutually. A typical example is Rayleigh scattered light/fluorescence. Whichever of optical process of Rayleigh scattered light and optical process of the fluorescence is used for a microscope, a similar imaging characteristic is exhibited. Similar to fluorescence, the Rayleigh scattered light is radiated omnidirectionally regardless of the incident direction of the excitation light. Even if, for example, a side wall of a cell is parallel to incident light, the Rayleigh scattered light generated from the side wall is radiated omnidirectionally since it is incoherent. Since the light returns backward as well, the side wall of the cell can be observed even if a reflection microscope is used. When the light derived from $\chi^{(3)}$ is observed with a confocal microscope, the confocal microscope has the sectioning capability. Also, since the theoretical limit value of the cut-off frequency that is an indicator of resolution is 4 NA/$\lambda$, the resolution is equivalent to that of a confocal fluorescence microscope.

Figure 3:
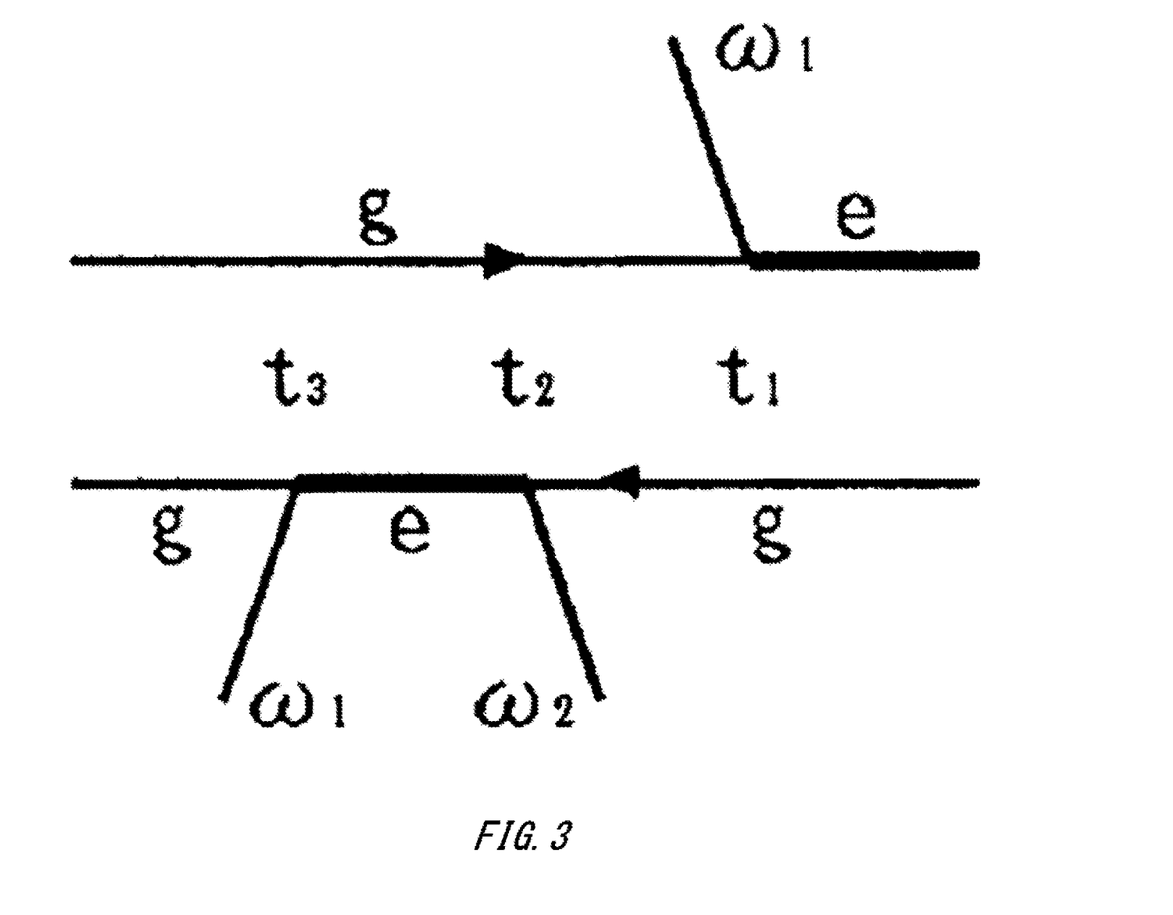
FIG. 3 is a diagram representing a process in which light having a frequency of $\omega^2$ is emitted after light having a frequency of $\omega^1$ enters.

The light derived from $\chi^{(3)}$ includes Rayleigh scattered light. In addition to the Rayleigh scattered light, the light derived from $\chi^{(3)}$ includes light generated through a spontaneous process, for example, Rayleigh-Wing scattered light, Brillouin scattered light, Raman scattered light and fluorescence, and the intensity of the Rayleigh scattered light is higher than that of the Raman scattered light or the Brillouin scattered light. A center wavelength of the Rayleigh scattered light included in the light derived from $\chi^{(3)}$ is not different from that of the excitation light, while a center wavelength of the other light included in the light derived from $\chi^{(3)}$ that is generated through a spontaneous process is different from that of the excitation light. For example, the second section of the known document, "Heitler experiment in J association" in Bussei Kenkyu (1997), 67 (4) written by Kohei Matsuda indicates that the Rayleigh scattered light is light derived from $\chi^{(3)}$ as follows. That is, although in general, the third-order non-linear susceptibility $\chi^{(3)}$ of a substance interacting with light is made up of a sum of multiple terms, the term corresponding to the Rayleigh scattering is only one term corresponding to the diagram shown in FIG. 3 and the imaginary part of the term represents the Rayleigh scattering spectrum.

Also, the ninth section of Nonlinear Optics (3rd edition) (ACADEMIC PRESS) written by Robert W. Boyd indicates that the spectral width of Rayleigh scattering depends on the disturbance relaxation time for relaxing disturbance of a density distribution (corresponding to the zero-point vibration of acoustic wave) of a substance causing Rayleigh scattering.

As seen from the above, the Rayleigh scattered light is light derived from $\chi^{(3)}$, and has a finite spectral width even if excited laser light has an infinitely narrow line width.

Referring back to FIG. 1, the blocking unit 103 in the detecting unit 102 is described specifically. The blocking unit 103 at least partially blocks the light derived from $\chi^{(1)}$ of the Rayleigh scattered light derived from $\chi^{(3)}$ and the light derived from $\chi^{(1)}$ included in the light from the observation target 10. This blocking is performed by utilizing interference occurring when the two beams of light reflected by the pair of mirrors 180 are combined by the beam splitter 170. Now, details of the blocking method are described using FIGS. 4 and 5.

Figure 4:
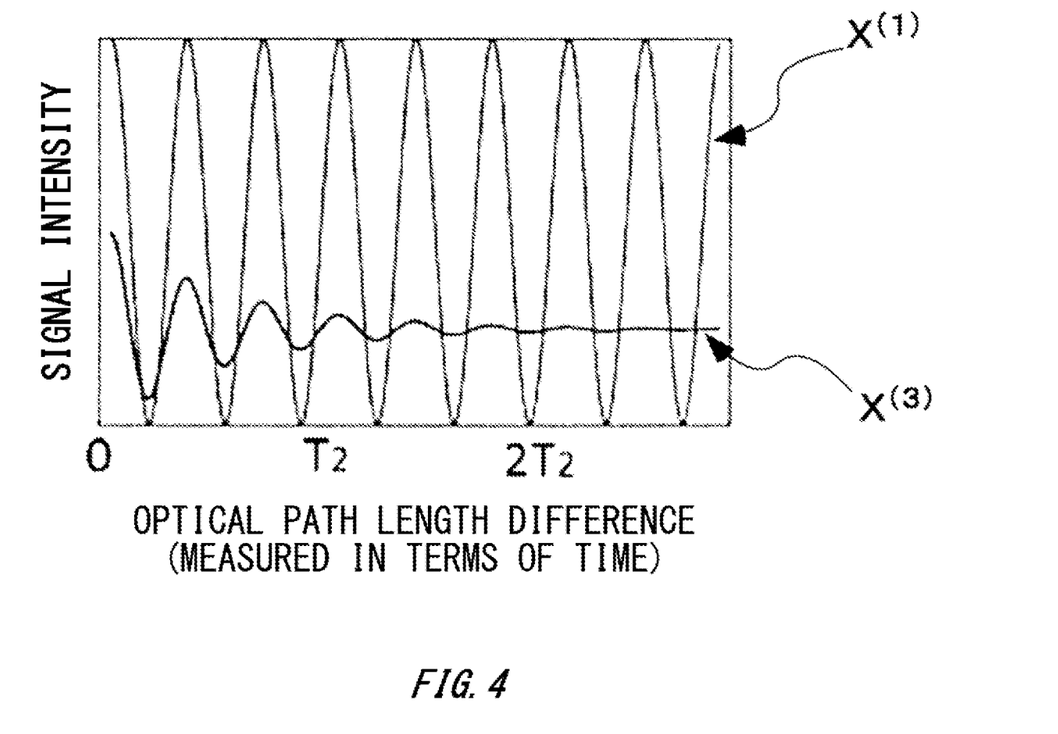
FIG. 4 is a graph showing dependency of a theoretical signal intensity of light on an optical path difference length.
Figure 5:
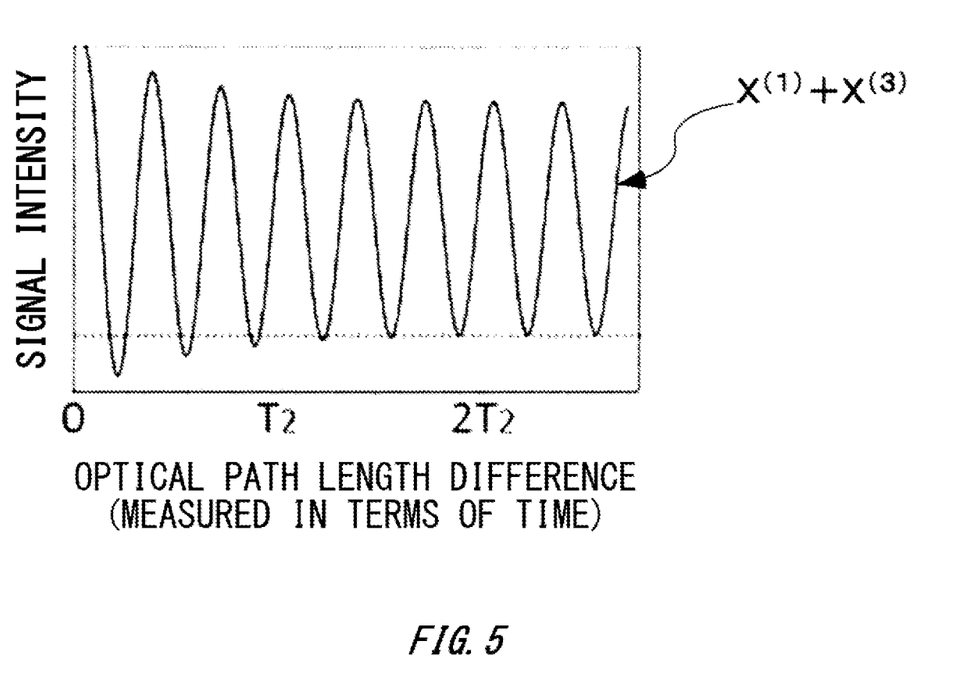
FIG. 5 is a graph showing dependency of an actually measured signal intensity of light on an optical path difference length.

FIG. 4 is a graph showing dependency of a theoretical signal intensity of each of Rayleigh scattered light derived from $\chi^{(3)}$ and light derived from $\chi^{(1)}$ that are obtained while optical path length difference is changed using the pair of mirrors 180, on an optical path difference length. FIG. 5 is a graph showing dependency of signal intensity of light actually measured in a similar way, on optical path difference length.

In both graphs in FIGS. 4 and 5, the horizontal axis is an optical path difference length measured in terms of time and the vertical axis is light signal intensity. Also, in FIGS. 4 and 5, the Rayleigh scattered light derived from $\chi^{(3)}$ is shown by $\chi^{(3)}$ and the light derived from $\chi^{(1)}$ is shown by $\chi^{(1)}$.

Since the light derived from $\chi^{(1)}$ is coherent light, the signal intensity changes periodically due to the interference effect as the optical path difference length becomes longer, as shown in FIG. 4. The spectral width of the light derived from $\chi^{(1)}$ is equal to the line width of the laser light from the laser light source 110. Therefore, when a CW laser light with a narrowband is used as excitation light, interference occurs indefinitely due to the long coherent length of the CW laser light even if the optical path length difference is changed, and the signal intensity of the light derived from $\chi^{(1)}$ changes periodically.

In contrast, the Rayleigh scattered light derived from $\chi^{(3)}$ is incoherent light. Therefore, as shown in FIG. 4, as the optical path difference length becomes longer, although the signal intensity periodically changes due to a measure of interference effect, the amplitude of the periodic change becomes small due to the phase relaxation time $T_2$ inherent to a substance, and eventually, the signal intensity exhibits a constant value. $T_2$ is proportional to the reciprocal number of a spectral width, and is expected to be up to approximately 10 ns in terms of time. This corresponds to a distance of up to 3 m, and the optical path difference length of that degree is realistic for an interferometer.

Using the graph showing the dependency of the signal intensity of the actually measured light on optical path difference length shown in FIG. 5, a method for at least partially blocking light derived from $\chi^{(1)}$ of Rayleigh scattered light derived from $\chi^{(3)}$ and light derived from $\chi^{(1)}$ is described. At first, the optical path length difference measured in terms of time is set to be longer than at least $2T_2$ that is twice as long as the phase relaxation time $T_2$. Within the range of this optical path length difference, while the signal intensity of the light derived from $\chi^{(1)}$ changes periodically, the signal intensity of the Rayleigh scattered light derived from $\chi^{(3)}$ is constant, as described above. Thus, the signal intensity of the light derived from $\chi^{(1)}$ can be limited to an extent capable of detecting the Rayleigh scattered light derived from $\chi^{(3)}$ by setting an optical path length difference so that the signal intensity of the actually measured light becomes smallest within the range of this optical path length difference, specifically, by actually measuring the light signal intensity with the movable mirror 181 of the pair of mirrors 180 being arranged at a position where the signal intensity of the actually measured light becomes smallest. With the technique, the resolution equivalent to that of a confocal fluorescence microscope can be obtained without staining.

In this way, the blocking unit 103 causes waves of the light derived from $\chi^{(1)}$ to weaken each other through interference by adjusting the optical path length difference using the pair of mirrors 180, to at least partially block the light derived from $\chi^{(1)}$ of the Rayleigh scattered light derived from $\chi^{(3)}$ and the light derived from $\chi^{(1)}$. Note that the expression herein, "cause waves of the light to weaken each other" includes splitting the light derived from $\chi^{(1)}$ having coherence into two beams of light having therebetween the optical path length difference which leads to the two beams of light being shifted in phase by $[n+(\frac{1}{2})]\lambda$ (n is an integer) from each other, where $\lambda$ is a wavelength of light, to cause the two beams of light to cancel each other when they are combined.

As described above, the observation apparatus 100 having the epi-illumination-type confocal optical system 101 in this embodiment at least partially blocks the light derived from $\chi^{(1)}$ and detects the Rayleigh scattered light derived from $\chi^{(3)}$, where the Rayleigh scattered light derived from $\chi^{(3)}$ and the light derived from $\chi^{(1)}$ are included in the light obtained from the observation target irradiated with excitation light, and outputs an observation image based on the Rayleigh scattered light derived from $\chi^{(3)}$. In this way, without staining of the observation target 10, the signals have sufficient intensity while interacting incoherently, the sectioning capability is provided, and the resolution equivalent to that of a confocal fluorescence microscope can be obtained. The observation apparatus 100 is realized by slightly changing a signal detecting unit in a common confocal microscope using a CW laser as the laser light source 110, and since high-speed drawing is possible, it is suitable for quick pathological diagnosis. Note that the configuration in the observation apparatus 100 may be an option of the confocal fluorescence microscope.

Figure 6:
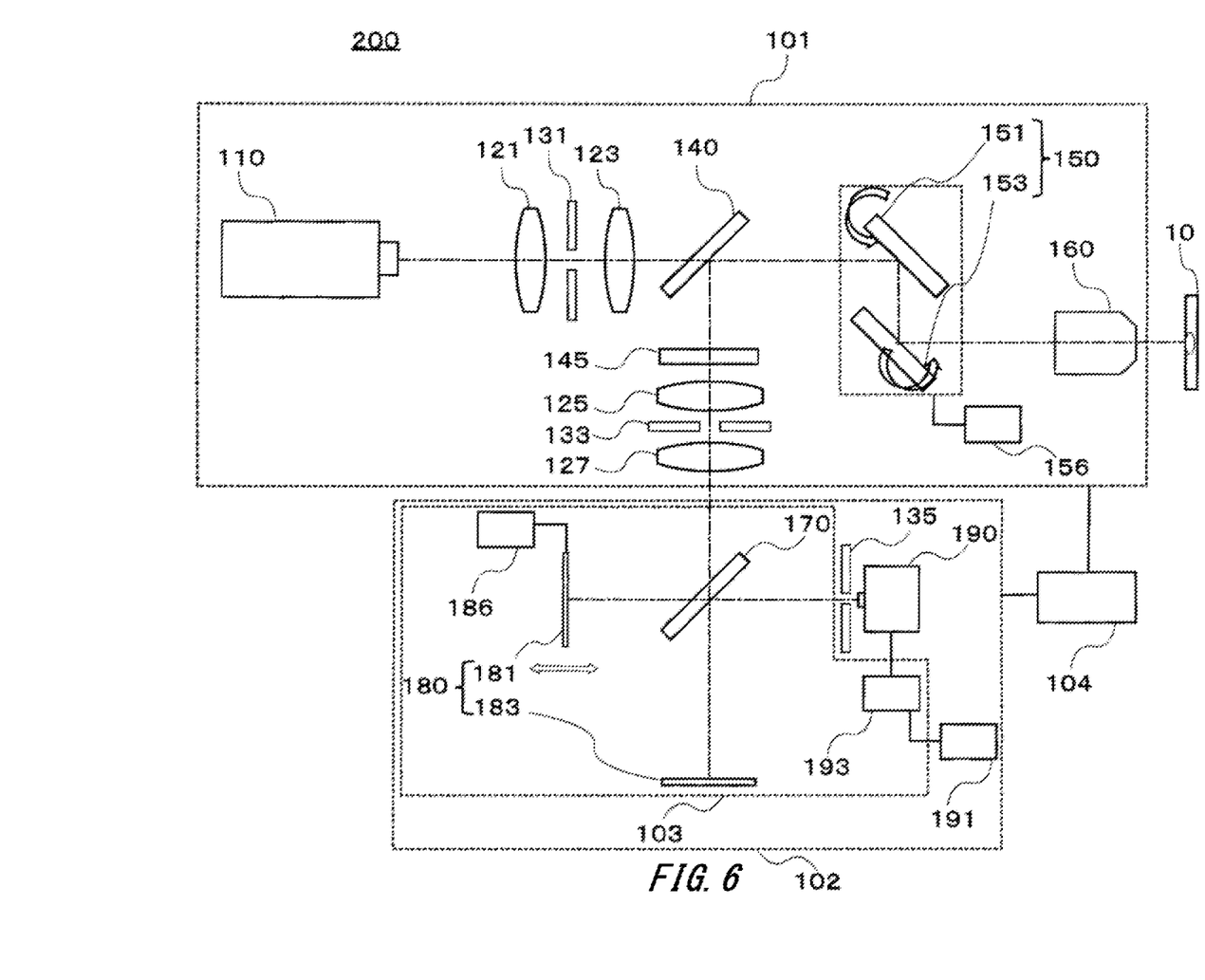
FIG. 6 is a schematic view of an observation apparatus 200.

FIG. 6 is a schematic view of an observation apparatus 200. Since the observation apparatus 200 has the same configuration as the observation apparatus 100 has, except that the blocking unit 103 has a lock-in detecting unit 193 and the output unit 191 in the detecting unit 102 is electrically connected to the detector 190 via the lock-in detecting unit 193, overlapping description is omitted.

The lock-in detecting unit 193 in the blocking unit 103 is a circuit which performs lock-in detection of a particular light signal and is electrically connected to the detector 190. The blocking unit 103 receives the Rayleigh scattered light derived from $\chi^{(3)}$ and the light derived from $\chi^{(1)}$, and at least partially blocks the light derived from $\chi^{(1)}$ and detects the Rayleigh scattered light derived from $\chi^{(3)}$ by using the lock-in detecting unit 193 to perform lock-in detection of the light from the observation target 10 detected by the detector 190, and detect and perform operations on a DC component and an AC component of the light. To be specific, at first, the light derived from $\chi^{(1)}$ is extracted from the light obtained from the observation target 10 by minutely vibrating, by the vibration driving unit 186, the movable mirror 181 at a high speed about a predetermined point and performing synchronous detection at the frequency of the oscillation of the light derived from $\chi^{(1)}$. Then, the Rayleigh scattered light derived from $\chi^{(3)}$ is detected by subtracting a half of the signal intensity of the extracted light derived from $\chi^{(1)}$ from the mean signal intensity of the light obtained from the observation target 10. In other words, the light derived from $\chi^{(1)}$ is blocked to the extent capable of detecting the Rayleigh scattered light derived from $\chi^{(3)}$ by using the lock-in detection. Also by the technique, the resolution equivalent to that of a confocal fluorescence microscope can be obtained without staining.

In the plurality of embodiments described above, since the observation apparatus is not of transmission type but of reflection type, observation can be conducted with a tissue cut or without cutting a tissue.

In the plurality of embodiments described above, scanning is conducted using the X-Y scanning mirror without changing the position of the observation target. Alternatively, scanning may be conducted by changing the position of a stage on which the observation target is placed in the X-Y direction. Also, with an additional Z scanning, the observation target may be measured in three dimensions by joining sectioned high-resolution images together in the depth direction.

In the plurality of embodiments described above, in the observation apparatus, the bandpass filter is not arranged within the detecting unit but on the optical path in the confocal optical system. Alternatively, the bandpass filter may not be arranged in the confocal optical system but on the optical path in the detecting unit, for example, it may be arranged in front of the detector. The configuration can also prevent Raman scattered light or intrinsic fluorescence from entering into the detector.

In the plurality of embodiments described above, the observation apparatus is described as being configured to detect Rayleigh scattered light derived from $\chi^{(3)}$ of the light obtained from the observation target irradiated with excitation light and output the observation image based on the Rayleigh scattered light derived from $\chi^{(3)}$. Additionally or alternatively, the observation apparatus may detect other light obtained from the observation target that is derived from $\chi^{(3)}$ and generated through a spontaneous process, for example, at least one of Rayleigh-Wing scattered light, Brillouin scattered light, Raman scattered light and fluorescence that is light derived from $\chi^{(3)}$, and output an observation image based on the light derived from $\chi^{(3)}$. In this case, the above-described bandpass filter may not be provided on the optical path, or other bandpass filter which transmits desired light only and filters out light other than the desired light may be provided on the optical path.

Also, additionally, in the plurality of embodiments described above, the microscope may be a setting-type microscope in which the observation target is held sandwiched between cover glasses. In this case, it is preferable that the cover glass be pressed so that the observation target is flattened. In this way, change in refraction index due to air surrounding the observation target can be suppressed.

Also, additionally, in the plurality of embodiments described above, the movable mirror of the pair of mirrors in the blocking unit may be shifted to obtain, at a video rate, images based on the light derived from $\chi^{(1)}$ which has overwhelmingly higher signal intensity than the light derived from $\chi^{(3)}$ has.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "at first" or "next" in the claims, embodiments, or diagrams, it does not necessarily mean that the process must be performed in this order.

EXPLANATION OF REFERENCES

10: observation target, 100: observation apparatus, 101: confocal optical system, 102: detecting unit, 103: blocking unit, 104: controlling unit, 110: laser light source, 121, 123, 125, 127: lens, 131, 133, 135: pinhole, 140: half-silvered mirror, 145: bandpass filter, 150: pair of X-Y scanning mirrors, 151, 153: X-Y scanning mirror, 156: scanning driving unit, 160: objective lens, 170: beam splitter, 180: pair of mirrors, 181: movable mirror, 183: stationary mirror, 186: vibration driving unit, 190: detector, 191: output unit, 193: lock-in detecting unit.

What is claimed is:

1. An observation apparatus, comprising:
    a coherent light source configured to irradiate an observation target with light;
    an interferometer configured to at least partially block light derived from $\chi^{(1)}$ for detecting Rayleigh-scattered light derived from $\chi^{(3)}$ being incoherent light, the light derived from $\chi^{(3)}$ and the light derived from $\chi^{(1)}$ being included in the light obtained from the observation target, by causing waves of the light derived from $\chi^{(1)}$ being coherent light having the same wavelength as the light of the coherent light source to weaken each other through interference;
    a photodetector configured to convert light passing through the intereferometer into an electrical signal; and
    a processor configured to generate an image based on the Rayleigh scattered light derived from $\chi^{(3)}$ represented by a remaining portion of the electrical signal.

2. The observation apparatus according to claim 1, wherein
    the interferometer has:
        at least one beam splitter arranged on an optical path of the light obtained from the observation target and configured to split the light into beams of light; and
        at least two mirrors capable of adjusting an optical path length difference between the beams of light from the beam splitter, and
    the interferometer at least partially blocks the light derived from $\chi^{(1)}$ by utilizing the interference occurring when the beams of light reflected by the at least two mirrors are combined.

3. The observation apparatus according to claim 2, wherein
    the interferometer at least partially blocks the light derived from $\chi^{(1)}$ by adjusting the optical path length difference using the at least two mirrors to cause the waves of the light derived from $\chi^{(1)}$ to weaken each other through the interference.

4. The observation apparatus according to claim 2, wherein the optical path length difference measured in terms of time is longer than $2T_2$ that is twice as long as a phase relaxation time $T_2$.

5. The observation apparatus according to claim 1, further comprising a bandpass filter arranged on an optical path of the light obtained from the observation target and configured to transmit the light derived from $\chi^{(1)}$, and transmit the Rayleigh scattered light and filter out light other than the Rayleigh scattered light, the Rayleigh scattered light and the light other than the Rayleigh scattered light being included in light derived from $\chi^{(3)}$ included in the light obtained from the observation target.

6. The observation apparatus according to claim 1, further comprising:
a lock-in detecting circuit configured to at least partially block, from the electrical signal, a portion of the electrical signal representing the light derived from $\chi^{(1)}$.

7. The observation apparatus according to claim 6, wherein the lock-in detecting circuit is configured to perform operations on a DC component and an AC component of the electrical signal.

8. The observation apparatus according to claim 6, wherein
the observation apparatus is a confocal optical system.

9. The observation apparatus according to claim 8, wherein
the confocal optical system is an epi-illumination optical system.

10. An observation method, comprising
at least partially blocking light derived from $\chi^{(1)}$ for detecting Rayleigh-scattered light derived from $\chi^{(3)}$, the light derived from $\chi^{(3)}$ being incoherent light and the light derived from $\chi^{(1)}$ being included in the light obtained from the observation target, by causing waves of the light derived from $\chi^{(1)}$ being coherent light having the same wavelength as the light of the coherent light source to weaken each other through interference;
converting light passing through an interferometer into an electrical signal;
at least partially blocking, from the electrical signal, a portion of the electrical signal representing the light derived from $\chi^{(1)}$; and
generating an image based on the detected Rayleigh scattered light derived from $\chi^{(3)}$ represented by a remaining portion of the electrical signal.

11. The observation method according to claim 10, wherein
the blocking light derived from $\chi^{(1)}$ for detecting Rayleigh-scattered light derived from $\chi^{(3)}$ includes:
splitting the light obtained from the observation target into beams of light by using a beam splitter;
adjusting an optical path length difference between the beams of light by at least two mirrors; and
utilizing the interference occurring when the beams of light reflected by the at least two mirrors are combined by the beam splitter.

12. The observation method according to claim 11, wherein the at least partially blocking the light derived from $\chi^{(1)}$ includes adjusting the optical path length difference using the at least two mirrors to cause the waves of the light derived from $\chi^{(1)}$ to weaken each other through the interference.

13. The observation method according to claim 11, wherein
the at least partially blocking, from the electrical signal, is performing a lock-in detection, and
the blocking light derived from $\chi^{(1)}$ for detecting Rayleigh-scattered light derived from $\chi^{(3)}$ includes:

vibrating at least one of the at least two mirrors in a predetermined direction; and
the performing lock-in detection includes detecting and performing operations on a DC component and an AC component of the light.

14. The observation method according to claim 11, wherein the blocking light derived from $\chi^{(1)}$ for detecting Rayleigh-scattered light derived from $\chi^{(3)}$ further includes setting the optical path length difference measured in terms of time to a time longer than $2T_2$ that is twice as long as a phase relaxation time $T_2$.

15. The observation method according to claim 10, further comprising transmitting the light derived from $\chi^{(1)}$, and transmitting the Rayleigh scattered light and filtering out light other than the Rayleigh scattered light, by arranging a bandpass filter on an optical path of the light obtained from the observation target, the Rayleigh scattered light and the light other than the Rayleigh scattered light being included in light derived from $\chi^{(3)}$ included in the light obtained from the observation target.

16. An observation apparatus, comprising:
a coherent light source configured to irradiate an observation target with excitation light;
at least one beam splitter arranged on an optical path of light obtained from the observation target and configured to split the light into beams of light, the light obtained from the observation target including light derived from $\chi^{(3)}$ and light derived from $\chi^{(1)}$;
at least two mirrors capable of adjusting an optical path length difference between the beams of light from the beam splitter;
a photomultiplier configured to convert the light into an electrical signal; and
a lock-in detecting circuit configured to detect Rayleigh scattered light derived from $\chi^{(3)}$ being incoherent light included in the beams of light reflected by the at least two mirrors, wherein
the beams of light from the beam splitter are combined after reflected by the at least two mirrors to cause waves of the light derived from $\chi^{(1)}$ being coherent light having the same wavelength as the excitation light of the coherent light source to weaken each other through interference, and
the lock-in detecting circuit detects the Rayleigh scattered light derived from $\chi^{(3)}$ included in the combined light by at least partially blocking, from the electrical signal, a portion of the electrical signal representing the light derived from $\chi^{(1)}$.

17. The observation apparatus according to claim 16, wherein the lock-in detecting circuit is further configured to perform operations on a DC component and an AC component of the electrical signal.

18. The observation apparatus according to claim 16, further comprising a bandpass filter configured to transmit the Rayleigh scattered light and filter out light other than the Rayleigh scattered light on the optical path, the Rayleigh scattered light and the light other than the Rayleigh scattered light being included in light derived from $\chi^{(3)}$ included in the light.

* * * * *

UNITED STATES PATENT AND TRADEMARK OFFICE
CERTIFICATE OF CORRECTION

PATENT NO. : 10,914,676 B2　　　　　　　　　　　　　　　　　　　　　　　　　　Page 1 of 1
APPLICATION NO. : 16/204372
DATED : February 9, 2021
INVENTOR(S) : Naoki Fukutake It is certified that error appears in the above-identified patent and that said Letters Patent is hereby corrected as shown below:

In the Claims

Column 10, Line 33:
In Claim 1, delete "intereferometer" and insert -- interferometer --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*